Feb. 1, 1949.  M. WEESNER  2,460,723
LINE MEASURING AND REELING DEVICE
Filed July 3, 1945  6 Sheets-Sheet 1

INVENTOR.
Max Weesner
BY
Wood, Arey, Herron & Evans
Attorneys

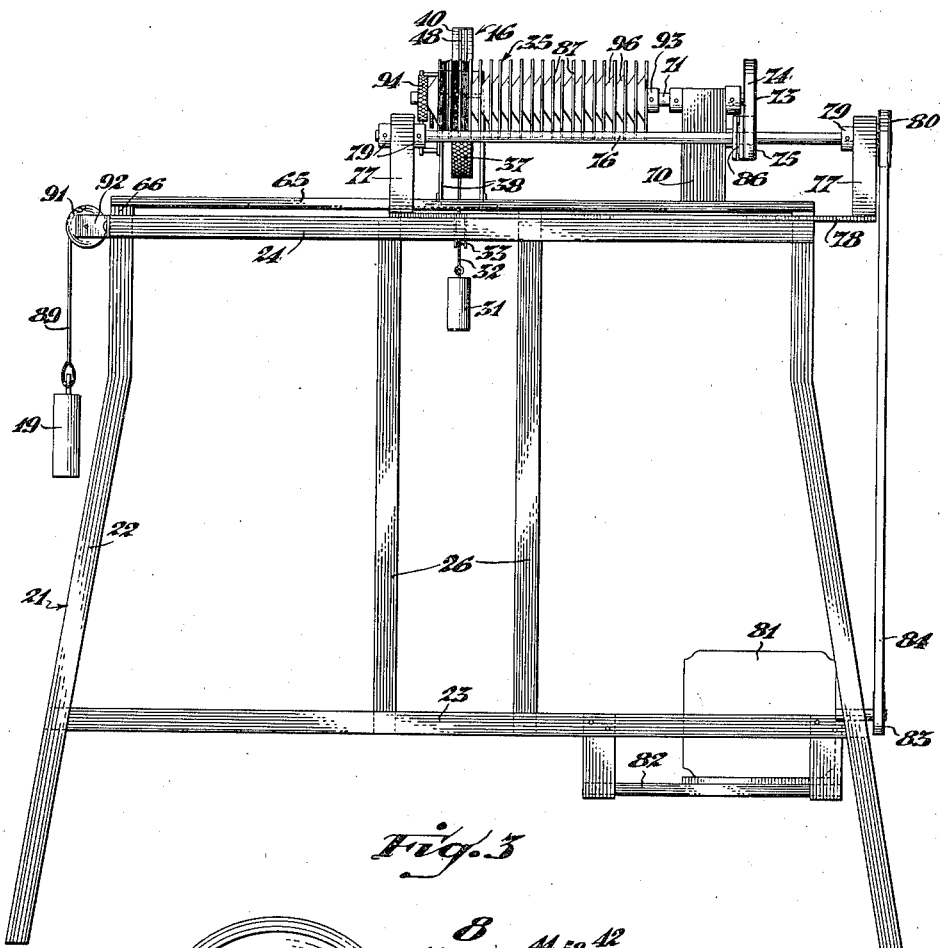

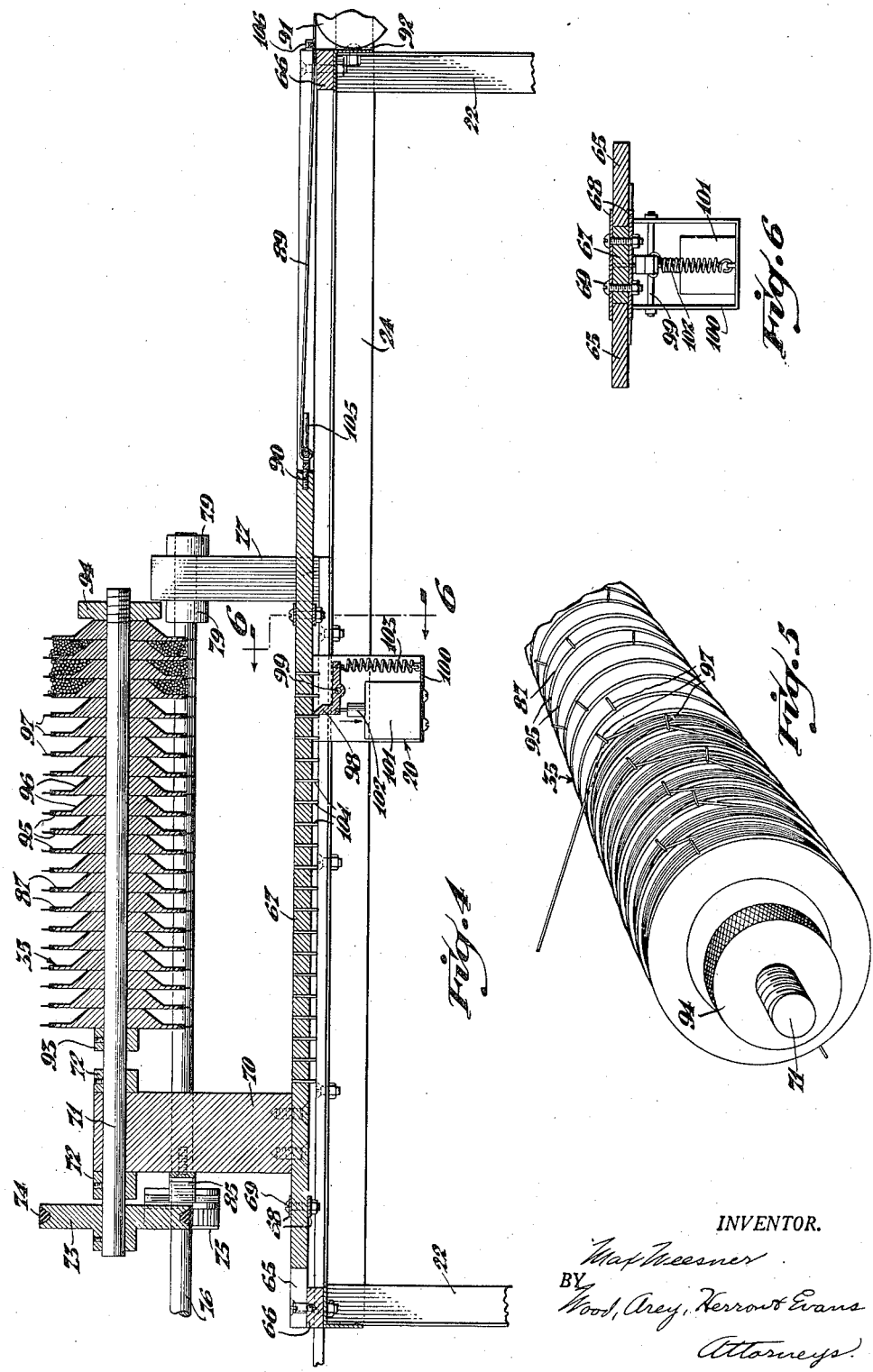

Feb. 1, 1949.                M. WEESNER                2,460,723
                  LINE MEASURING AND REELING DEVICE
Filed July 3, 1945                                6 Sheets-Sheet 5

INVENTOR.
Max Weesner
BY
Wood, Arey, Herrout Evans
Attorneys

Feb. 1, 1949.   M. WEESNER   2,460,723
LINE MEASURING AND REELING DEVICE
Filed July 3, 1945   6 Sheets-Sheet 6

INVENTOR.
Max Weesner
BY
Wood, Arey, Herron & Evans
Attorneys.

Patented Feb. 1, 1949

2,460,723

UNITED STATES PATENT OFFICE 2,460,723

LINE MEASURING AND REELING DEVICE

Max Weesner, Cincinnati, Ohio, assignor to The Weezel Bait Company, Cincinnati, Ohio, a corporation of Ohio Application July 3, 1945, Serial No. 602,992

7 Claims. (Cl. 242—35.5)

1

This quickly relates to line measuring and reeling machinery. More particularly, it relates to a machine which will automatically produce a multiplicity of coils of line, such as fishing line, each of the coils including a definite length of line, such as one hundred yards.

In the construction of the present machine, the inventor has accomplished the broad, new and useful result of providing mechanical means for quickly and accurately producing great numbers of identical coils of line or the like. This accomplishment represents a great advance over the tedious means employed in the prior art wherein each coil has been independently produced.

Further, the inventor has provided means whereby the operator may quickly and easily remove the completed coils of line from the machine when all spools have been wound.

Additional improvements in the art reside in the structure of the machine wherein; the line, as continuously and rapidly fed to the spools, is shifted to successive spools without decrease in speed and at precisely the right moment for placing identical lengths of line on each spool; and the machine is automatically stopped when the last spool is wound.

Other objects and certain advantages of the invention will be apparent from a description of the drawings in which:

Figure 3 is a front view thereof.

Figure 4 is a sectional view taken on line 4—4 of Figure 2 showing, in enlarged detail, the arrangement of the reels and the reel carriage shifting mechanism.

Figure 5 is a fragmentary perspective view illustrating the reels and detailing the pins on the reels and their function in transferring the run of line to the succeeding reels.

Figure 6 is a sectional view taken on line 6—6 of Figure 4 further detailing the release dog for the carriage.

Figure 7 is a fragmentary view enlarged out of Figure 1 for detailing the line measuring device.

Figure 1:
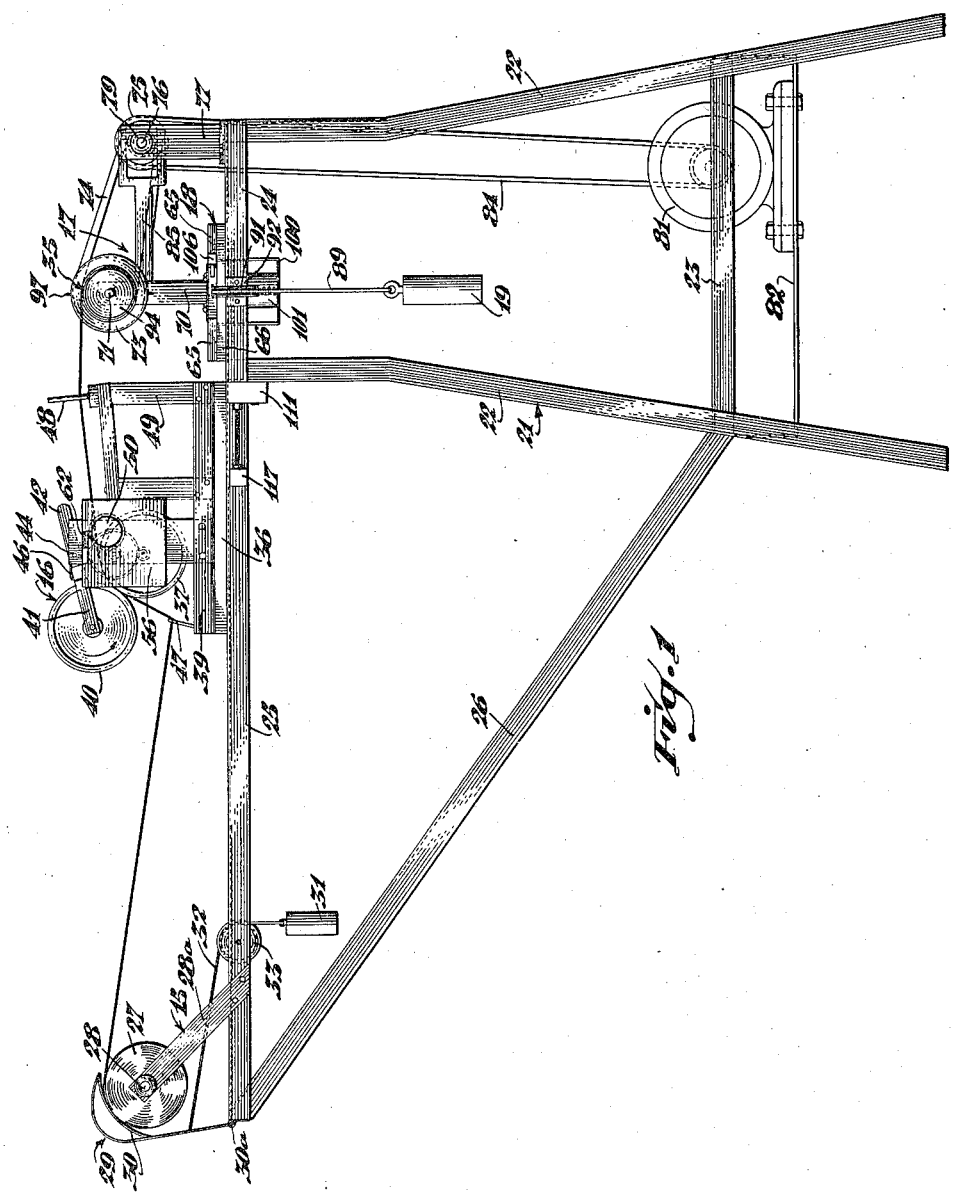
Figure 1 is a side view of the machine looking toward that side from which the reels are removed.

2 circuit of this device in which the significant mechanical parts are indicated symbolically.

The machine of this invention as illustrated in the drawings consists of the following principal mechanisms. A spool mount 15 supports the spool of the line. From this mount, the line passes through a measuring device 16. The details of the measuring device are not a part of this invention except insofar as the device is employed and arranged in the combination to control the shifting of the reel carriage when each spool has had wound upon it the correct amount of line.

A carriage 17 carries the reels and is mounted for translation on a slideway 18. Movement of the carriage is induced by means of a weight 19. Release of the carriage for movement is controlled by a release mechanism 20 which is electrically operated and controlled from the measuring device. Each time the appropriate or predetermined amount of line has been wound on a reel the carriage is shifted to direct the line onto the next reel.

Referring to the drawing, it will be observed that these devices are mounted on a frame generally indicated at 21. This frame includes four legs 22 which are angularly disposed to provide a wider base for stability. The lower ends of these legs are connected by rails 23 and the upper ends by rails 24. The frame is extended at one side by means of rails 25 for supporting the spool mount 15 and the measuring device 16. Braces 26 extend from one of the rails 23 to the outer ends of the extension rails 25. These frame elements are formed of angle iron strips and are secured together by any conventional means.

The rotative support for the spool of line 27 consists of a bolt 28 passed through and supported in the upper ends of the support pieces 28a. These pieces are secured to the extension rails 25 at an angle away from the measuring device so as to be braced against the reeling pull.

A device 29 is employed for keeping the line taut as the spool unwinds and for causing the unwinding to be steady with no lost motion of the spool. This device consists of an arcuate element 30 resting on the spool and pivotally mounted as at 30a on the ends of the extension rails. A weight 31 is attached to this arcuate element just above its pivot by means of a cable 32. The cable extends over a grooved idler pulley 33 mounted on a support rod 34 between the extension rails. Thus the weight causes the arcuate element to exert a steady drag on the spool.

Figure 8:
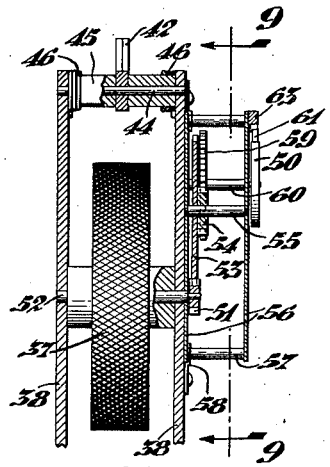
Figure 8 is a sectional view taken on line 8—8 of Figure 7 showing further details of the device.

The line measuring device 16 is mounted on the extension rails 25 toward the main portion of the frame and the line passes through it to the reels 35 of the reeling unit. A base plate 36 is mounted on the rails for supporting the measuring device. A roller 37 is rotatively mounted in side brackets 38 fixed to angle iron strips 39 attached to the base plate 36. Another roller 40 is journalled in the bifurcations 41 of a pivoted bracket 42. This bracket 42 is rotatively mounted (see Figure 8) on a pivot rod 44 fixed in the tops of the brackets 38. Spacer sleeves 45 center the pivoted bracket between the brackets 38.

Figure 2:
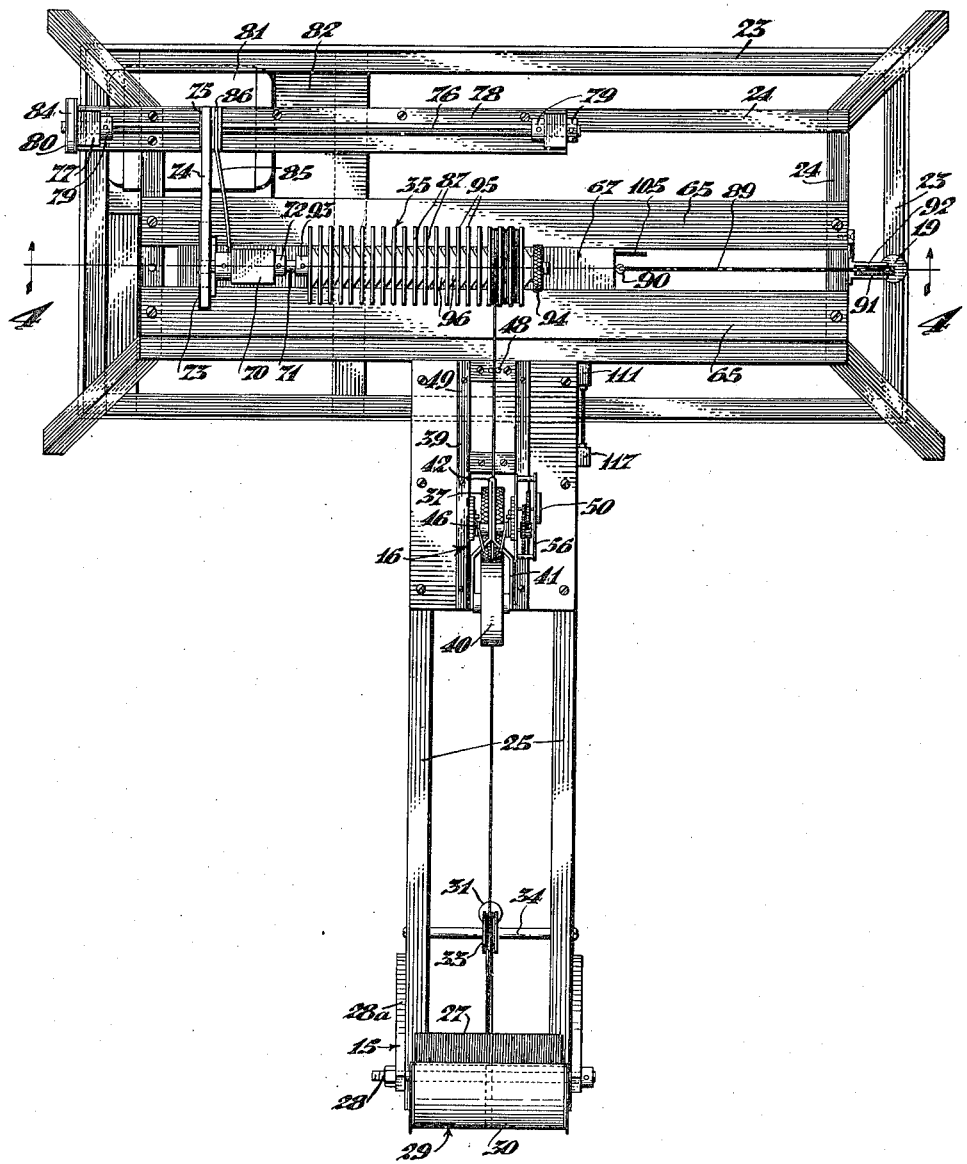
Figure 2 is a top plan view of the machine illustrating the arrangement of reels and showing the line wound on several reels.

The roller 40 is urged toward the roller 37 by means of coil springs 46 disposed around the spacer sleeves with one end anchored to the bracket in each case and the other end engaged against the top of a bifurcation (see Figure 2). The line is threaded through an eyelet 47 fixed to the base plate 36 and passes over the roller 37 which is knurled to prevent slippage, and between this roller and the idler roller 40. Thence the line passes through a guide 48 fixed to a framework 49 attached to the angle iron pieces 39.

Figure 9:
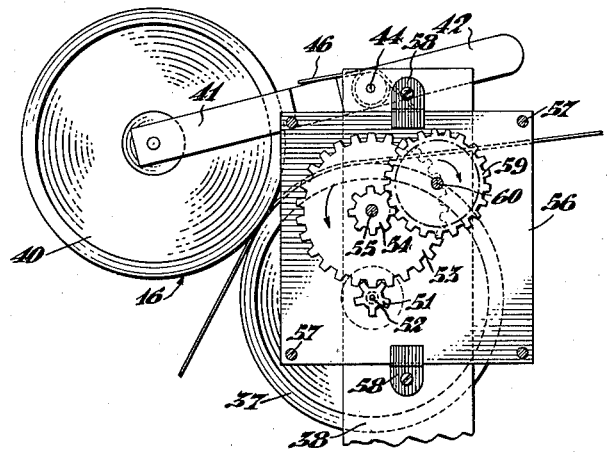
Figure 9 is a sectional view taken on line 9—9 of Figure 8 showing the gearing for the device.

Therefore, as the line is drawn through the measuring rollers it rotates the knurled roller. This motion is conveyed to a trip disc 50 through gearing as follows. A spur gear 51 is fixed to the shaft 52 which is fixed to the roller 37. This spur gear is in mesh with the large gear 53 of a cluster, including a spur gear 54. Gears 53, 54 are rotatively mounted on a shaft 55 fixed between the side plates 56 of a transmission support frame. The plates of this frame are spaced and secured together by means of studs 57. The frame is secured to the side bracket 38 by means of clips 58 at the top and bottom (Figure 9).

The spur gear 54 meshes with a large gear 59 fixed on a shaft 60 which carries the trip disc 50 on the outside of the transmission frame. The trip disc has tripping spur 61 extending radially from its periphery. This spur is adapted to engage and close the blades 62 of a switch 63 mounted on the frame. Leads extend from this switch to the reel carriage control and will be described later in the description of the control circuit.

The carriage 17 carrying the spools for reeling the line in measured yardage is mounted in a slideway constituted by two spaced rails or guides 65 mounted lengthwise of the main frame of the machine on cross bars 66 on the rails 24. The base 67 of the carriage (Figures 4 and 6) is an elongated element disposed between the guides. It is maintained in this position by means of upper and lower plates 68 overlying and underlying the guides and secured to the body by means of bolts 69.

A bearing bracket 70 is secured upon one end of this base 67. This bracket rotatively supports one end of the spool shaft 71. The shaft 71 is secured against axial movement in the bearing by means of collars 72. A driving pulley 73 is fixed on the supported end of the shaft and is driven by means of a belt 74 driven from a pulley 75 on the splined driving shaft 76. The driving shaft is supported for rotation in end bearings 77 supported on and secured to the ends of a base element 78 extending along a side rail 24. Collars 79 at each side of each bearing 77 hold the driving shaft 76 against axial movement. One of these collars is constituted by a driving pulley 80 fixed to the end of the drive shaft.

An electric motor 81 is supported on a plate 82 secured between the rails 24 at the base of the machine. The motor shaft carries a pulley 83 and a belt 84 connects the pulleys 80 and 83. The pulley 75 is in splined connection with the drive shaft and is attached to the carriage, so as to move with it, by means of a bifurcated element 85. One end of the element 85 is rigidly fixed to the end of the carriage (Figure 4) by means of screws and its bifurcated end extends into the groove 86 in the pulley 75 adjacent the belt groove thereof. Thus the carriage may be translated along the slideway, carrying the pulley 75 along with it.

The carriage is translated for advancing the spools 87, fixed on its shaft 71, by means of the weight 19. This weight is attached to the end of the carriage base 67 by means of a cable 89. The cable is secured to a stud 90 projecting from the end of the base and extends over an idler pulley 91 for supporting the weight. Brackets 92 mount the pulley 91 on the end of the frame. Thus the weight constantly urges the carriage in feeding movement. This translation is controlled by means of the device 20.

A number of spools 87, in this case twenty-one, are clamped together on the shaft for rotative connection therewith. A stop collar 93 is fixed on the shaft 71 adjacent the support bearing 70. The spools are clamped against this collar by means of a knurled nuts 94 threaded on the free end of the shaft 71. Each spool includes a circular flange 95 and a tapered hub 96. When clamped together the adjacent spools provide a spooling groove sufficient for receiving the measured amount of line. Also each spool includes a line transfer pin 97 projecting radially from its flange. The utility of these pins will be fully apparent in the description of operation of the machine.

The carriage feed control device 20 consists of a dog or finger 98 pivotally mounted on a rod 99 fixed in the walls of a bracket 100 depending from the underside of the slideway elements or guides 65. This bracket 100 is U-shaped and carries a dog operating solenoid 101, the plunger 102 of which is attached to one end of the pivoted dog. The other end of the dog is pulled downwardly by means of a coiled tension spring 103 secured between the dog and the base of the U-shaped bracket. This spring thus holds the operating point of the dog against the underside of the carriage base. The base includes a series of pins 104 one for each spool except the first. When the solenoid pulls the operating point of the dog downward momentarily a pin is cleared and a spool advanced.

A stud 105 projecting from the end of the carriage engages a limit switch 106 for stopping the power (Figure 2) after the last. It will be noted that although there are twenty-one spool elements only twenty spooling grooves are provided and accordingly only twenty stop pins 104 are required.

The transfer action of the pins 97 will be apparent from an inspection of Figure 5. As the carriage is shifted and the spools moved laterally relative to the line being reeled, the line will be drawn over against the flange of the reel where the pin 97 will engage it throwing it into the next spooling groove.

Figure 10:
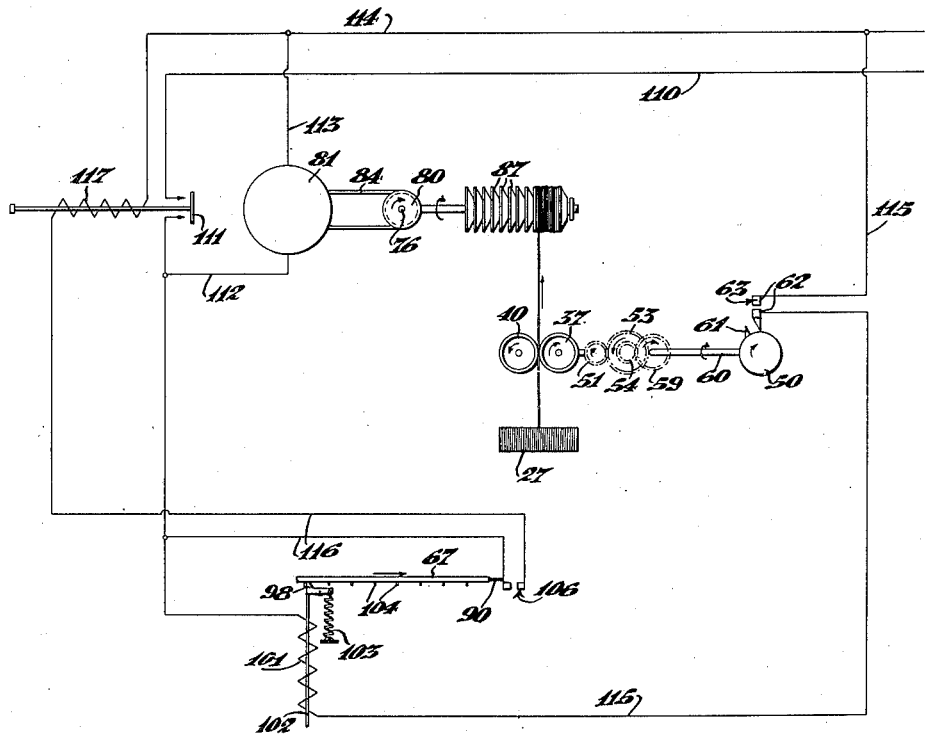
Figure 10 is a diagram of the electrical control

Referring to the wiring diagram (Figure 10) the current flows through the main lead 110 to a switch 111 which is manually operated for permitting the current to pass through the lead 112 to the motor 81 which drives the spools 87. From the motor, lead 113 completes the circuit to the other main lead 114.

A lead 115 extends from the main lead 114 through the switch 63 to the solenoid 101 and thence to the main lead 110. Thus, when the tripping point 61 on the disc 59 of the measuring device momentarily closes the switch blades 62, 62 the solenoid 101 is energized and the tripping lever or dog 98 is pulled down momentarily for disengaging the particular pin 104 and allowing the carriage to be translated one spool. Since this circuit is completed for an instant only the tripping lever or dog is down just long enough to clear one pin, the spring 103 returning it for engagement with the next pin.

When the line is wound on the last reel, the projection 90 on the end of the carriage closes the blades on the switch 106 for completing the circuit from lead 110 through lead 116 to a solenoid 117, connected to the main switch 111, and then to the main lead 114. Thus the motor is stopped when the limit switch 106 is closed.

When all the reels have been wound the operator removes them from their clamped positions on the shaft 71 after loosening and removing the nut 94. Before doing this, the line is cut adjacent each pin 97. Then the coils of line are removed from the spools.

As shown in the drawings each spool flange may be provided with more than one pin 97 to provide a more accurate line measurement in the event that the switch 63 is closed at such a time when the line would just miss one pin. In this case, the next pin will catch the line and eliminate the necessity of another complete revolution before the line is transferred to the next reel.

One of the uses to which this machine has been put is that of producing coils of fishing line of uniform length for use in fishing kits.

Having described the invention, I claim:

1. A machine for producing coils of line, comprising, a line measuring device, a series of spools for receiving the line and control means for directing the line onto successive spools, said control means being actuated from said measuring device for shifting the line to the next successive spool when a measured amount of line has passed through the device.

2. In a line coiling machine, a means for rotatively supporting a roll of line, a measuring device through which said line passes, a drive shaft, a series of spools, means for clamping said spools side by side on said shaft, means for driving said shaft, each of said spools including one flange, the adjacent flange of the next spool forming the coiling groove therewith, and means for shifting said line from one spool to the next adjacent spool, said means being controlled from said measuring device for shifting the line when a measured amount of line has been wound on each spool.

3. In a line coiling machine, a means for rotatively supporting a roll of line, a measuring device through which said line is delivered, a drive shaft, a series of reels, means for clamping said reels on said drive shaft, shiftable means supporting said drive shaft and reels, means for causing shifting of said shiftable means axially of said shaft and a distance equal to the width of one spool, said latter means being controlled from said measuring device for causing the shift when a measured amount of line has been delivered to each spool, and means on the spools for causing the line to leave one spool and to start to wind on the next when the shift occurs.

4. In a machine for forming coils of line, a measuring device through which a line is delivered, a translatable carriage, a drive shaft mounted on said carriage having its axis disposed parallel with the direction of movement of said carriage, a series of spools, means for clamping said spools side by side on said shaft, means for urging said carriage in one direction, a solenoid operated spring returned dog, stops on said carriage one for each spool, said dog normally engaged with a stop for restraining said carriage, a switch on said measuring device adapted to be closed for momentarily directing electrical energy to said solenoid when a measured amount of line has been wound on each spool for shifting the line to the next adjacent spool and line diverting means on each spool for causing a quick transfer of the line from spool to spool as the carriage is shifted.

5. In a machine for forming coils of line, a drive shaft, a series of spools clamped on said shaft in side by side relationship, means for moving said shaft axially, means for rotatively supporting a roll of line, a measuring device through which said line passes to said spools, means for causing axial movement of said shaft a distance equal to the width of each spool, said means being actuated by said measuring device each time a measured amount of line has passed through said measuring device, and means associated with each spool for diverting the line from each spool to the next adjacent spool when each movement of the shaft takes place.

6. In a machine for forming coils of line, comprising a series of adjacently disposed laterally shiftable driven spools, means for delivering a continuous length of line to said spools, each spool having a radially disposed pin projecting from its circular flange, and control means for causing lateral shift of the spools a distance equal to the width of a spool when a certain amount of line has been wound on each spool whereby each pin diverts the line to the next adjacent spool at the aforesaid time.

7. A machine of the class described, comprising, a series of adjacent spools, means for driving said spools as a unit, a device for delivering a continuous length of line to said spools, control means for shifting the line to successive adjacent spools, a measuring device through which said line passes, and an electrical control circuit for operating said control means when a predetermined length of line has passed through said measuring device.

MAX WEESNER.

REFERENCES CITED

The following references are of record in the file of this patent:

UNITED STATES PATENTS

| Number | Name | Date |
|---|---|---|
| 282,580 | Smith | Aug. 7, 1883 |
| 2,373,109 | Fitzgerald | Apr. 10, 1945 |